(12) United States Patent
Wen et al.

(10) Patent No.: US 7,760,972 B2
(45) Date of Patent: Jul. 20, 2010

(54) MULTIPORT SWITCH FOR OPTICAL PERFORMANCE MONITOR

(75) Inventors: Joe Wen, Fremont, CA (US); Samuel Liu, San Jose, CA (US); Giovanni Barbarossa, Saratoga, CA (US)

(73) Assignee: Oclaro Technology, plc, Paignton (GB)

( * ) Notice: Subject to any disclaimer, the term of this patent is extended or adjusted under 35 U.S.C. 154(b) by 820 days.

(21) Appl. No.: 11/389,812

(22) Filed: Mar. 27, 2006

(65) Prior Publication Data

US 2007/0223861 A1 Sep. 27, 2007

(51) Int. Cl.
*G02B 6/26* (2006.01)
*G02B 6/42* (2006.01)

(52) U.S. Cl. .............................. 385/22; 385/16; 385/18; 385/23; 385/24; 385/39; 385/47; 385/140

(58) Field of Classification Search .................. 385/16, 385/18, 22–24, 47, 140; 359/39
See application file for complete search history.

(56) References Cited

U.S. PATENT DOCUMENTS

| | | | |
|---|---|---|---|
| 6,031,946 A | 2/2000 | Bergmann et al. | |
| 6,344,910 B1 | 2/2002 | Cao | |
| 6,371,662 B1 | 4/2002 | Leard et al. | |
| 6,516,119 B2 | 2/2003 | Menezo et al. | |
| 6,549,549 B2 | 4/2003 | Mousseaux et al. | |
| 6,590,697 B2 * | 7/2003 | Vaganov | 359/296 |
| 6,621,837 B2 | 9/2003 | Le-Gall et al. | |
| 6,628,882 B2 | 9/2003 | Vaganov et al. | |
| 6,690,859 B2 | 2/2004 | Menezo | |
| 6,847,664 B2 | 1/2005 | Le-Gall | |
| 6,894,789 B2 | 5/2005 | Le-Gall | |
| 6,980,727 B1 | 12/2005 | Lin et al. | |
| 7,092,609 B2 * | 8/2006 | Yegnanarayanan et al. | 385/131 |
| 2006/0093258 A1 * | 5/2006 | Terahara et al. | 385/18 |

FOREIGN PATENT DOCUMENTS

| | | |
|---|---|---|
| JP | A-62-75606 | 4/1987 |
| JP | A-11-326210 | 11/1999 |

OTHER PUBLICATIONS

Agiltron, Inc., *MEMS Variable Optical Attenuator (VOA)*, Revision: 050-10, 2005.

* cited by examiner

*Primary Examiner*—Charlie Peng
*Assistant Examiner*—Michael P Mooney
(74) *Attorney, Agent, or Firm*—Patterson & Sheridan, LLP

(57) ABSTRACT

The present invention provides a switch assembly for use with a single-port OPM to realize a multi-port OPM having improved reliability. In one embodiment, an N×1 optical switch assembly, wherein N is an integer greater than one, is provided. The optical switch assembly includes N optical input ports, N micro-electro-mechanical system (MEMS) variable optical attenuators (VOAs), where each MEMS VOA is optically coupled to a respective optical input port and is operable between an on position and an off position, and an N×1 optical combiner optically coupled to the N MEMS VOAs. Each MEMS VOA is configured to transmit an optical signal from a respective one of the optical input ports to the N×1 optical combiner in the on position and to not transmit the optical signal in the off position.

20 Claims, 5 Drawing Sheets

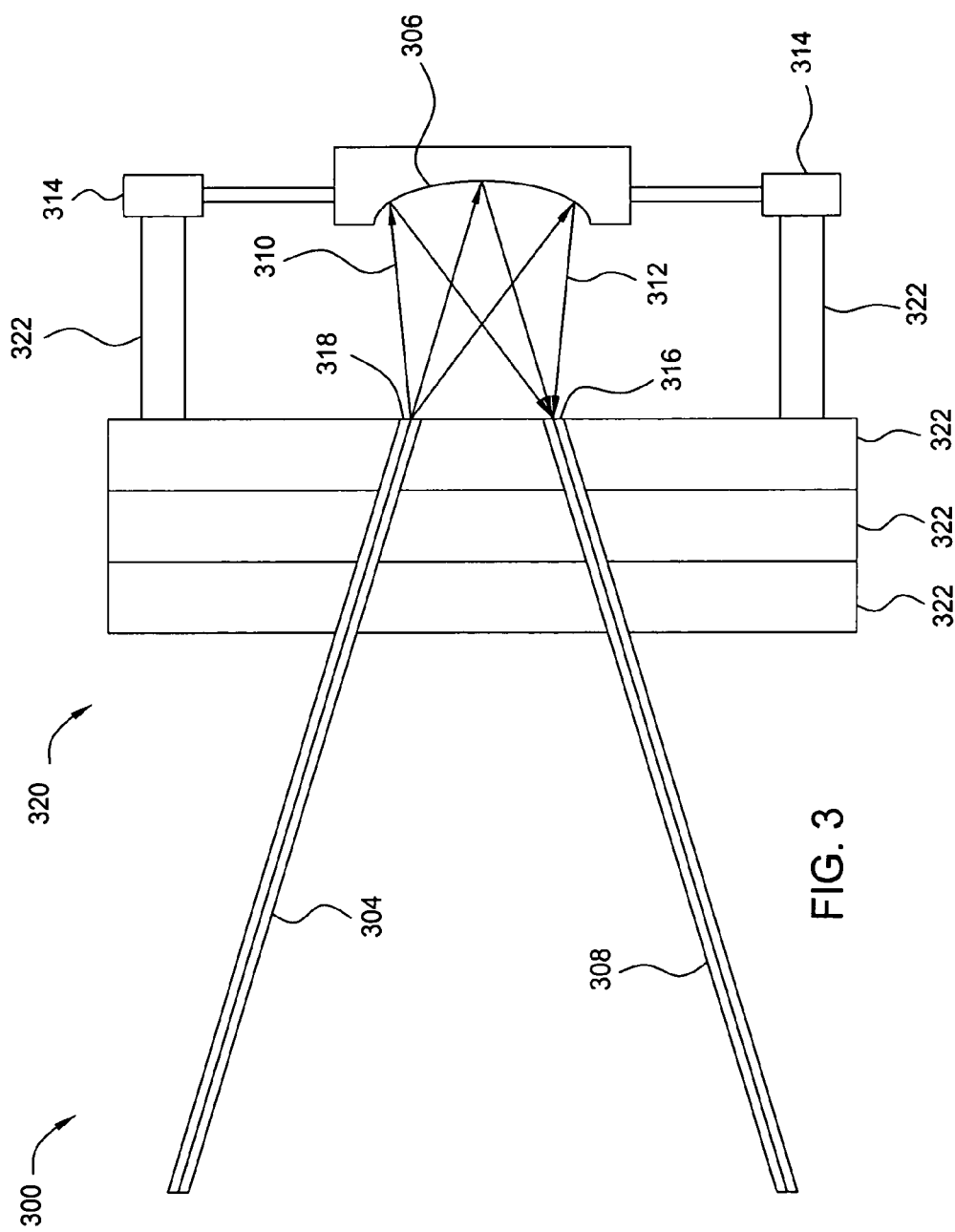

MULTIPORT SWITCH FOR OPTICAL PERFORMANCE MONITOR

BACKGROUND OF THE INVENTION

1. Field of the Invention

The present invention relates to fiber optic networks, and more particularly, to monitoring the performance of fiber optic networks.

2. Description of the Related Art

Fiber optic networks are becoming increasingly popular for data transmission due to their high speed and high capacity capabilities. As the traffic on fiber optic networks increases, monitoring and management of the networks become increasingly more significant issues. To monitor the network, the spectral characteristics of an optical signal at particular points in the network are determined and analyzed. This information may then be used to alter the performance of the network if the signal characteristics are less than optimal. Real time monitoring of this information is also important during setup and reconfiguration of the network.

FIG. 1A illustrates a bi-directional, wavelength division multiplexed (WDM) optical network 100 which utilizes an optical performance monitor (OPM) assembly 130 between a first node 120 and a second node 140. The multichannel optical network 100 comprises banks of light sources 105a,b which provide the light carrier wavelengths upon which the signals are modulated. These light sources, each occupying a different channel, are combined into a single optical fiber through a fiber-optic multiplexer (not shown). The signals then travel along optical fibers 110a-d between the two nodes 120,140. Each carrier wavelength, or channel, carries one signal in the WDM system. The totality of multiplexed signals carried by the optical fibers 110a-d in each direction is herein referred to as a composite signal. Occasionally, the signals have to be amplified by optical amplifiers 125a,b, such as Erbium Doped Fiber Amplifiers (EDFAs) or Raman amplifiers, due to attenuation of the signal strength. Typically, an optical signal is amplified after it travels approximately eighty kilometers or fifty miles.

The OPM assembly 130 may be located at various locations within the network 100 for the purpose of monitoring the characteristics of the optical signal so that the performance of the optical components of the network 100 may be determined. In one example, optical taps 115a,c are located proximate to respective upstream ports of the optical amplifiers 125a,b and optical taps 115b,d are located proximate to respective downstream ports of the optical amplifiers 125a,b. Providing upstream 115a,c and downstream taps 115b,d for the OPM 130 proximate the optical amplifiers 125a,b allows the OPM assembly 130 to measure the composite signal on either side of the optical amplifiers 125a,b and monitor the performance of the optical amplifiers 125a,b. Alternatively or in addition to monitoring the optical amplifiers 125a,b in the network 100, the OPM 120 may be used to monitor add/drop stations 135a,b in the network 100 as illustrated in FIG. 1B.

Typically, manufacturers offer only a single-port OPM 130a. In order to allow the single-port OPM 130a to accommodate a line from each of the taps 115a-d, a 4×1 optical switch assembly 130b is provided. The 4×1 switch assembly 130b includes a mechanical switch 130c-f for each of the four lines. Typically, these switches 130c-f are actuated continuously cycling through all input ports on the order of once per second. In order to have an acceptable service lifetime on the order of ten to twenty years, the switches need to endure about one billion cycles. Conventional mechanical switches, however, typically fail after about a million cycles. Therefore, frequent replacement of the mechanical switches is necessary.

As the foregoing illustrates, there exists a need in the art for a more reliable switch assembly for an OPM.

SUMMARY OF THE INVENTION

The present invention provides a switch assembly for use with a single-port OPM having improved reliability. In one embodiment, an N×1 optical switch assembly, wherein N is an integer greater than one, is provided. The optical switch assembly includes N optical input ports, N micro-electro-mechanical system (MEMS) variable optical attenuators (VOAs), where each MEMS VOA is optically coupled to a respective optical input port and is operable between an on position and an off position, and an N×1 optical combiner optically coupled to the N MEMS VOAs. In an "on" position, each MEMS VOA is configured to transmit an optical signal from a particular optical input port of the optical switch assembly to the N×1 optical combiner. In an "off" position, each MEMS VOA is configured to not transmit the optical signal.

Use of the MEMS VOAs instead of conventional switches advantageously improves the service life of the switch assembly. This improvement is due to the slight amount of actuation displacement of the MEMS mirror during operation, which limits fatigue stresses sustained by the MEMS VOAs over time.

BRIEF DESCRIPTION OF THE DRAWINGS

FIG. 3 illustrates a micro-electro-mechanical system variable optical attenuator suitable for use with the 4×1 optical switch of FIG. 2.

DETAILED DESCRIPTION

Figure 1A:
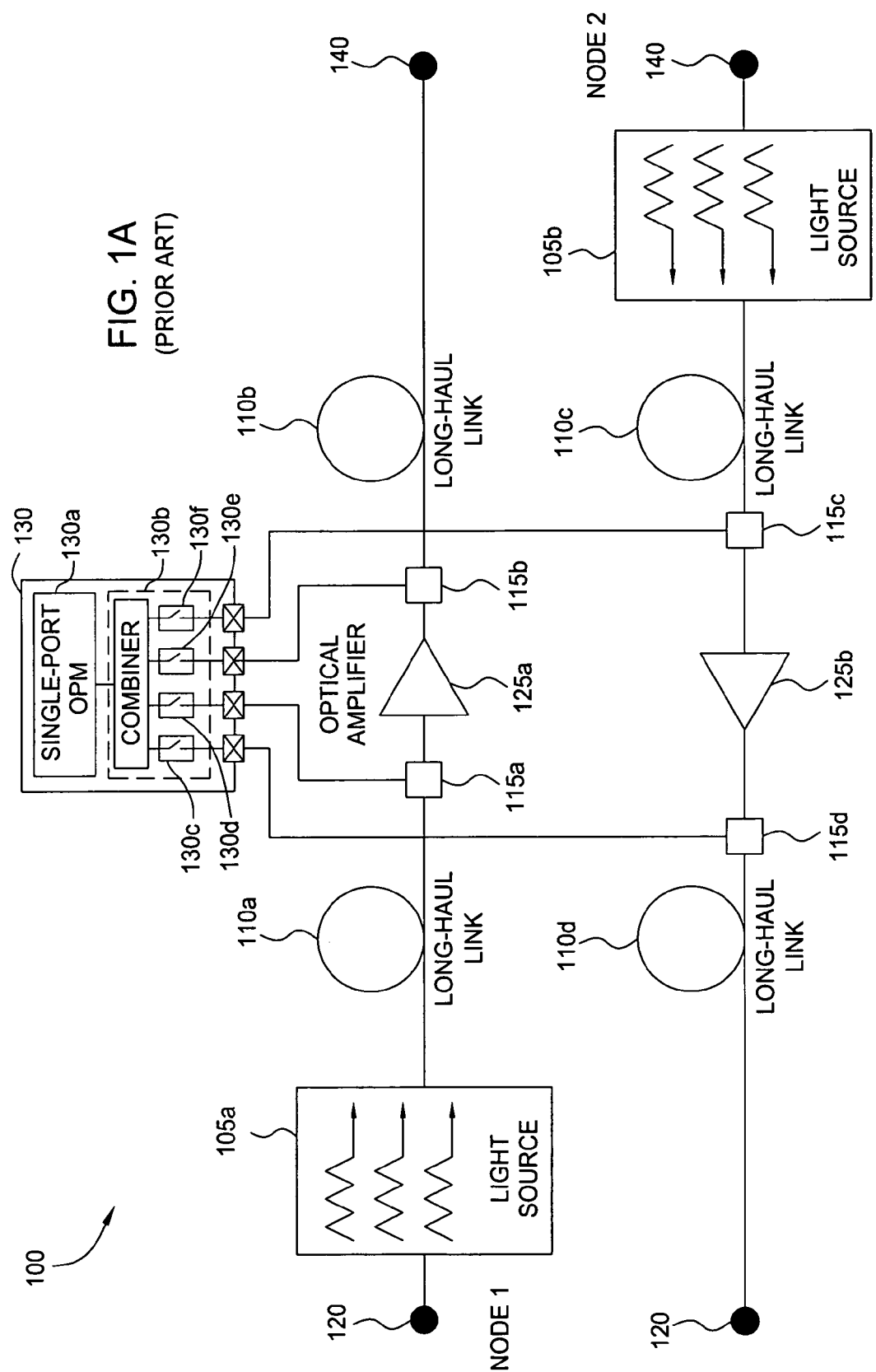
FIGS. 1A and 1B illustrate a prior art optical networks each utilizing an optical performance monitor.
Figure 1B:
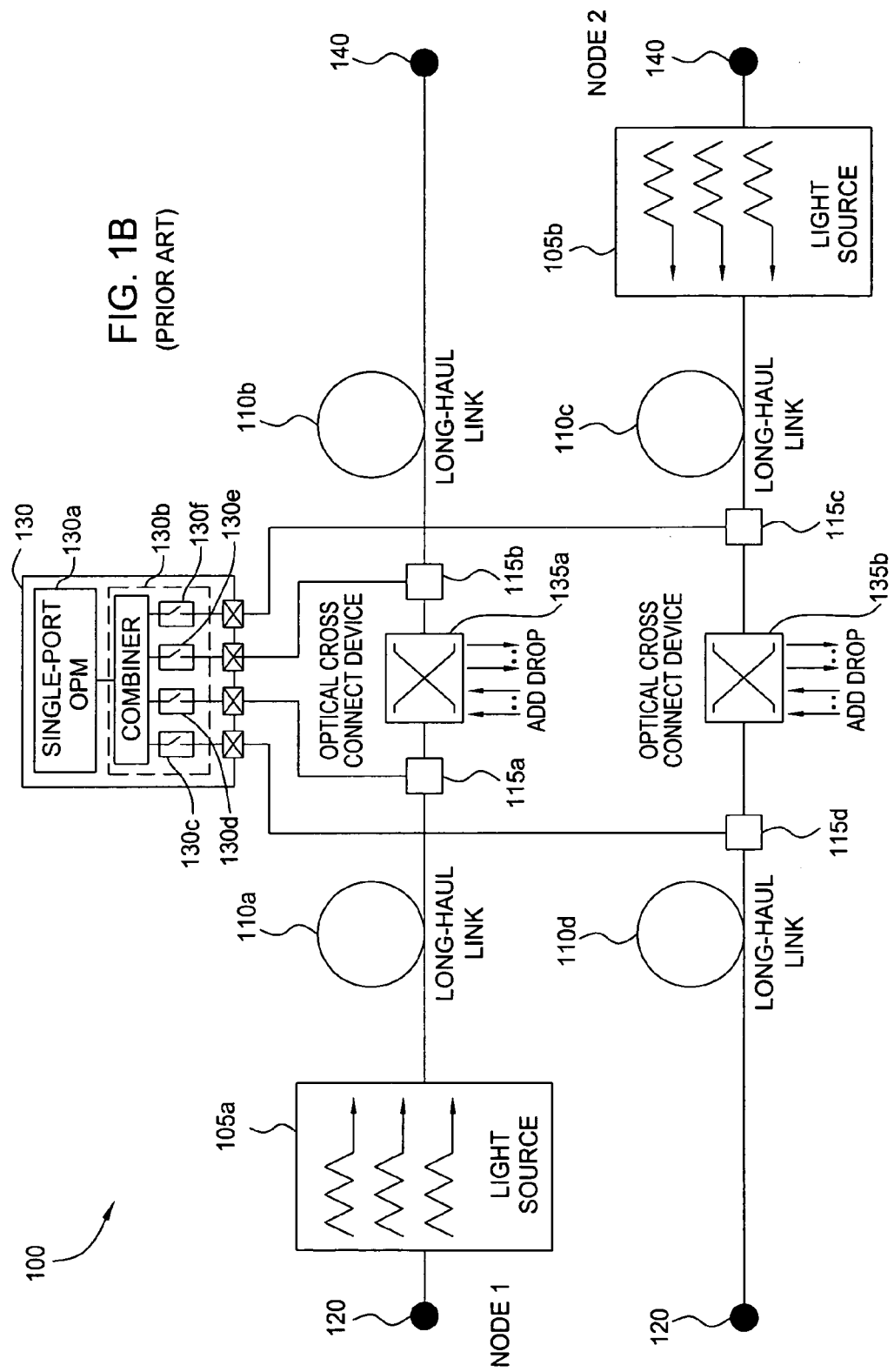
Figure 2:
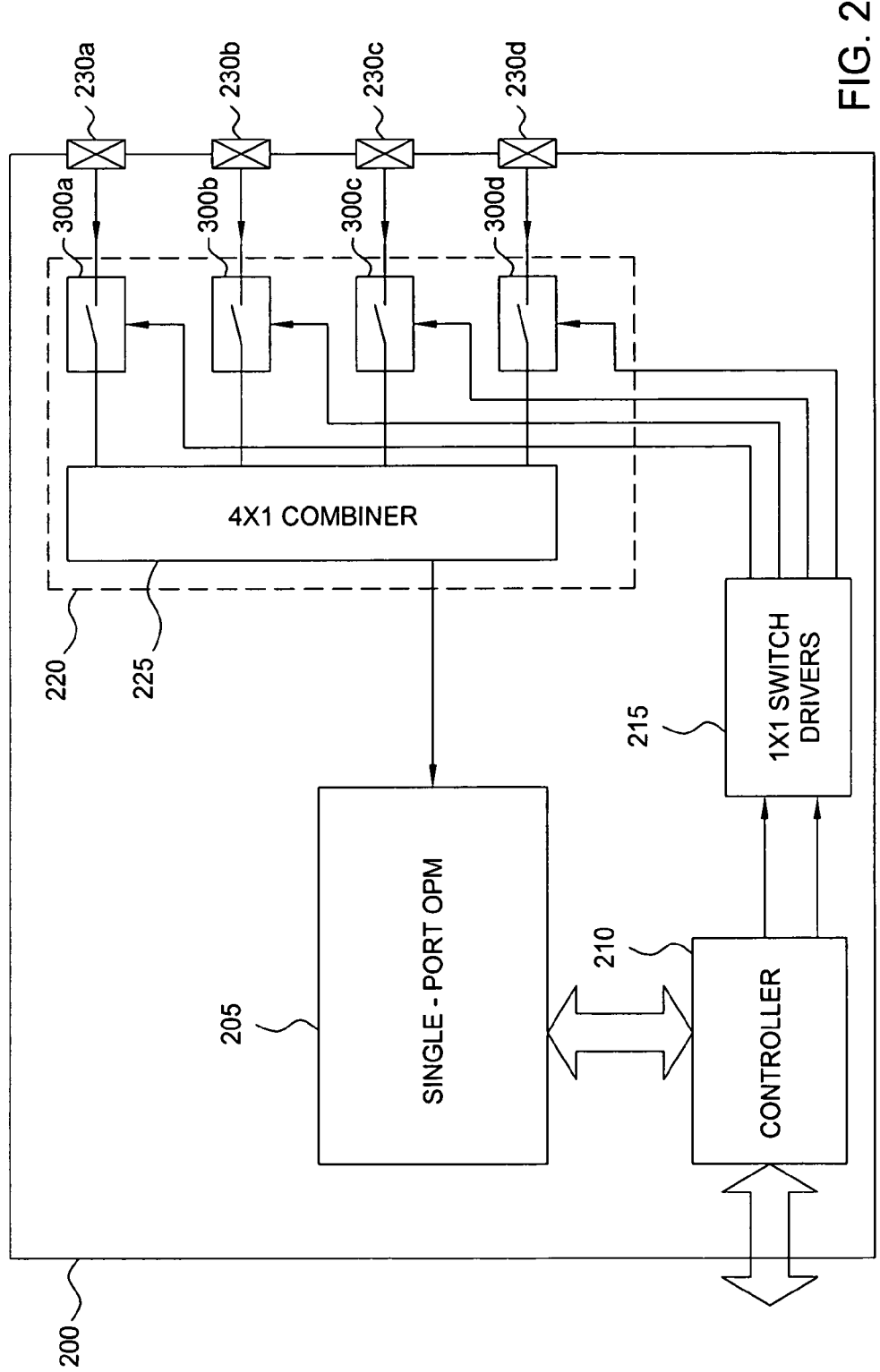
FIG. 2 illustrates a four port optical performance monitor assembly having a 4×1 optical switch assembly, according to one embodiment of the present invention.

FIG. 2 illustrates a four port optical performance monitor (OPM) assembly 200 having a 4×1 optical switch assembly 220, according to one embodiment of the present invention. The OPM assembly 200 may replace the OPM assembly 130 in the optical networks 100 of FIGS. 1A and 1B. As shown, the OPM assembly 200 includes a 4×1 switch assembly 220, a single-port OPM 205, a controller 210, and a switch driver 215. The switch assembly 220 includes four input ports 230a-d, four micro-electro-mechanical system (MEMS) variable optical attenuators (VOAs) 300a-d, and a 4×1 optical combiner 225.

Each of the input ports 230a-d may be optically coupled to a respective one of the optical taps 115a-d of FIG. 1. Each of the input ports 230a-d is also optically coupled to a respective MEMS VOA 300a-d. Each of the MEMS VOAs 300a-d is operable between an "on" position and an "off" position by application of an electrical current from the switch driver 215. Each MEMS VOA 300a-d is configured to transmit an optical signal from a respective input port 230a-d to the optical combiner 225 in the "on" position and to not transmit an optical signal from the respective input port 230a-d in the "off" position. As described in greater detail herein, only one of the MEMS VOAs 300a-d is in the "on" position at any particular time during operation of the OPM assembly 200. Importantly, any increase in insertion losses caused by using MEMS VOAs in the switch assembly 220 can be easily compensated for by increasing an input power range of the single-port OPM.

The optical combiner 225 serves as an interface between the four input ports 230a-d and the single-port OPM 205. The 4×1 optical combiner 225 may be constructed using two 2×1 combiners in series with a third 2×1 combiner or by using planar lightwave circuit (PLC) technology.

Figure 2A:
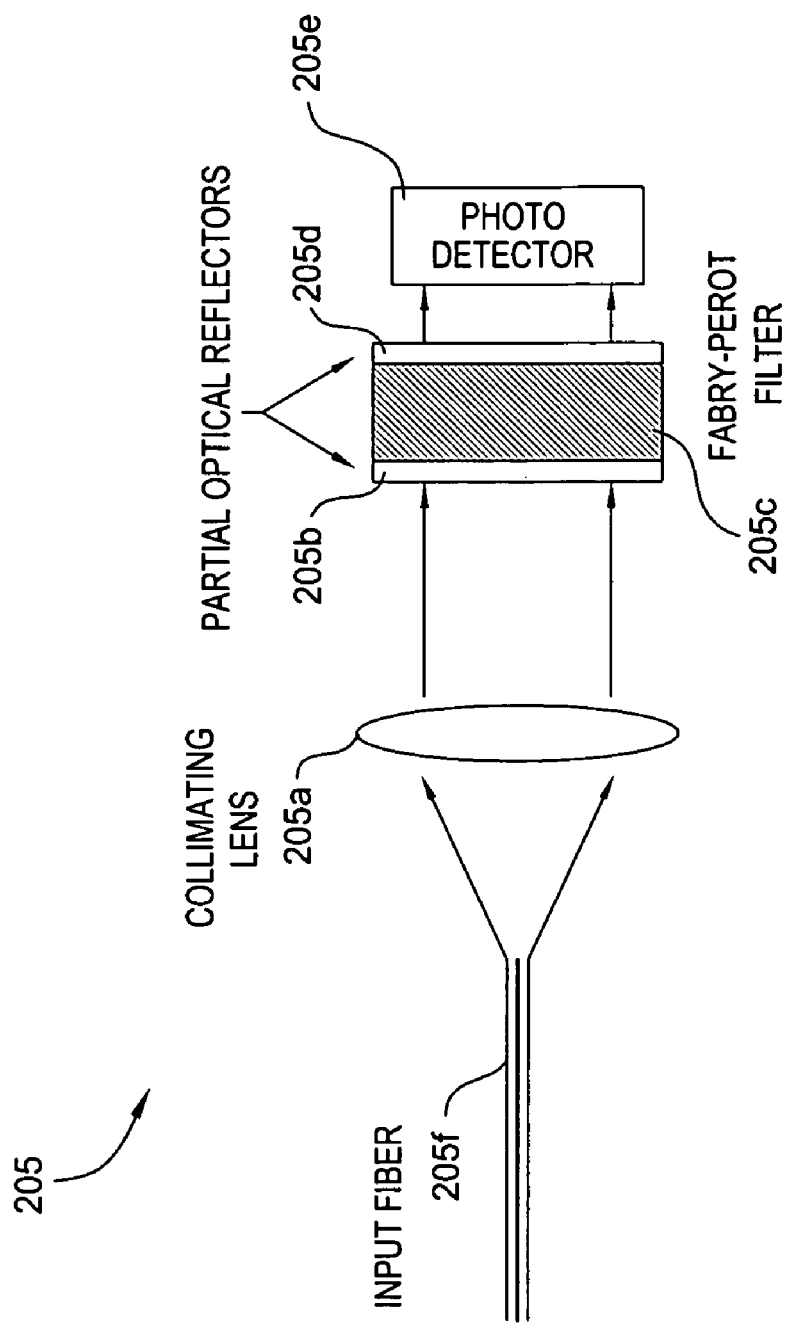
FIG. 2A illustrates an example of an optical performance monitor suitable for use with FIG. 2.

The single-port OPM 205 may be any one of several known in the art. One suitable single-port OPM 205, illustrated in FIG. 2A, is a Fabry-Perot interferometer 205. The Fabry-Perot interferometer 205 is an optical filter which can be tuned to scan its center resonance wavelength through a certain wavelength range. The Fabry-Perot interferometer 205 includes two planar partial optical reflectors 205b,d which are parallel (preferably, exactly parallel) and placed at a distance from each other, with an optical medium 205c between them. The two partial optical reflectors 205b,d and the medium 205c in between them form a cavity of certain optical length. The resonance center wavelength of the cavity equals to the optical cavity length divided by n+½, where n is an integer greater than or equal to zero. A cavity has multiple such resonance center wavelengths. There are at least three ways to realize tuning the resonance wavelength of the Fabry-Perot interferometer 205: 1) by tilting the angle of the reflector relative to the incident optical beam, 2) by changing the distance between the two reflectors 205b,d, and 3) by changing the refractive index of the optical medium 205c between the reflectors 205b,d.

In operation, collimated (by collimating lens 205a) polychromatic light is input into the Fabry-Perot interferometer 205 through the outside face of the first partial optical reflector 205b. Those wavelengths of the light which match the resonance wavelength of the Fabry-Perot interferometer 205 exit the interferometer from the side opposite an input optical fiber 205f and are sampled by the photodetector 205e. The photodetector 205e can then output the power of these wavelengths for analysis. All other wavelengths of the light are not transmitted through Fabry-Perot interferometer 205 to the photodetector 205e due to destructive interference. Fabry-Perot interferometers are well known in the art and will not be further discussed here.

The controller 210 is electrically coupled to the single-port OPM 205 and the switch drivers 215, each of which is electrically coupled to a respective one of the MEMS VOAs 300a-d. In operation, the controller 215 signals one of the MEMS VOAs 300a-d, for example 300a, via the respective one of the switch drivers 215, into the "on" position, either by providing or removing an electrical current or voltage (depending on the default setting of the MEMS VOA 300a). A sample of the composite optical signal is then transmitted from the tap 115a, through the port 230a, the MEMS VOA 300a, and the combiner 225 into the single-port OPM 205. The single-port OPM 205 then measures the desired parameters, i.e. power level and noise level, of the composite optical signal. The controller 210 then receives the desired parameters from the single-port OPM 205. Upon receiving the signal or series of signals from the single-port OPM 205, the controller 210 shuts off the MEMS VOA 300a and turns on another one of the other three MEMS VOAs, for example MEMS VOA 300b. The above-process is then repeated for the signal from the tap 115b.

The controller 210 may be responsible for analyzing the data received from the single-port OPM 205 to determine the performance of amplifier 125a, or the controller 210 may transfer the data to a computer (not shown) for analysis. If the amplifier 125a is not operating properly or optimally, parameters of the optical amplifier 125a may be adjusted or the amplifier may even be serviced or replaced. A similar process may also be performed for MEMS VOAs 300c,d to monitor the performance of the amplifier 125b.

The order of the above-described steps is not important. For example, an entire cycle of switching and sampling may be performed before the data is analyzed and the order of switching may be arbitrary. Alternatively, the single-port OPM may have its own controller in which case the controller 210 would only handle switching control upon a signal from the OPM controller.

FIG. 3 illustrates a micro-electro-mechanical system (MEMS) variable optical attenuator (VOA) 300 suitable for use with the 4×1 optical switch of the four port optical performance monitor of FIG. 2. As shown, the MEMS VOA 300 is in the "on" position and includes an input photonic component 304, a collimating lens (not shown), a movable reflecting mirror 306, and an output photonic component 308. A light beam 310 exits the input photonic component 304 (and travels through the collimating lens) and then reaches the reflecting focusing mirror 306. The reflecting mirror 306 reflects the light beam 310 (back through the collimating lens and) into a focused light beam 312. One or more mirror actuators 314, preferably electrostatic actuators, actuate the reflecting mirror 306 between an on position and an off position. The movable focusing mirror 306 steers and controllably aligns (on position) or misaligns (off position) the light beam onto a receiving face 316 of the photonic device. The controlled misalignment of the light beam onto the receiving face enables an attenuation of the optical signal by allowing only a small portion, preferably substantially no portion, of the reflected light beam to enter the photonic component 308 for transmission.

The movable focusing mirror 306 may be or comprise a concave mirror, a diffractive mirror, a diffractive concave mirror, a Fresnel mirror, a Zone plate mirror, or another suitable movable focusing mirror known in the art.

The input photonic component 304 and the output photonic component 308 may each be a wave guide, a planar wave guide, an optical fiber, an optical lens, a spherical lens, an aspherical lens, a ball lens, a GRIN lens, a C-lens, a lens system, a prism, a mirror or a collimator, or another suitable photonic component for transmitting and/or receiving the light beam.

Alternatively, the mirror actuators 314 of the MEMS VOAs 300 may be actuators selected from the group consisting of an electro-mechanical actuator, a piezo-electric actuator, a thermo-mechanical actuator, an electromagnetic actuator, and a polymer actuator. The polymer actuator may include an electro-active polymer actuator, an optical-active polymer, a chemically active polymer actuator, a magneto-active polymer actuator, an acousto-active polymer actuator and a thermally active polymer actuator.

The focusing mirror 306 and the mirror actuators 314 are integrated onto a substrate 320. The substrate 320 and one or more substrate elements 322 may each be or comprise a wafer. The substrate 320 and the substrate elements 322 may comprise suitable materials known in the art, such as a single wafer of glass or semiconductor material. The substrate 320 may be two or a plurality of coupled substrate elements 322. The substrate elements 322 may be individual wafers and may be bonded, adhered, or otherwise coupled with a suitable coupling technique known in the art. The substrate 320 and substrate elements 322 may be suitable substrate materials known in the art, to include semiconductor material, glass, silica, ceramic, metal, metal alloy, and polymer. The semiconductor material may be suitable substrate materials, to include Silicon, Silicon Carbide, Gallium Arsenide, Gallium Nitride, and Indium Phosphide.

MEMS VOAs such as the one depicted in FIG. 3 are known to those skilled in the art. As is also known, the MEMS VOAs 300a-d may be structurally integrated into a MEMS VOA array. In addition, the switch assembly 220 may be structurally integrated as one physical unit. Further, the entire OPM assembly 200 may be structurally integrated as one physical unit.

Use of the MEMS VOAs instead of conventional switches advantageously improves the service life of the switch assembly 220. This improvement is due to the slight amount of actuation displacement of the MEMS VOAs, which limits fatigue stresses sustained by the MEMS VOAs over time.

While the foregoing is directed to embodiments of the present invention, other and further embodiments of the invention may be devised without departing from the basic scope thereof. For example, the 4×1 switch assembly 220 is only a preferred embodiment of the present invention. Alternatively, the switch assembly (and thus the OPM assembly and the combiner) may have dimensions of N×1 (or 1×N), wherein N is an integer greater than one. (As persons skilled in the art recognize, OPMs usually referred to as N port instead of N×1.) In view of the foregoing, the scope of the present invention is determined by the claims that follow.

The invention claimed is:

1. An N×1 optical switch assembly, wherein N is an integer greater than one, the optical switch assembly comprising:
   N optical input ports;
   N micro-electro-mechanical system (MEMS) variable optical attenuators (VOAs), wherein each MEMS VOA is optically coupled to a different one of the N optical input ports and is operable between an on position and an off position and wherein the MEMS VOAs are controlled so that, when one of the MEMS VOAs is in the on position the remaining MEMS VOAs are in the off position; and
   an N×1 optical combiner optically coupled to the N MEMS VOAs, wherein each MEMS VOA is configured to transmit an optical signal from the different one of the optical input ports to the N×1 optical combiner in the on position and to not transmit the optical signal in the off position.

2. The N×1 optical switch assembly of claim 1, wherein N equals four.

3. The N×1 optical switch assembly of claim 1, wherein each of the N MEMS VOAs are operable by application of an electric current.

4. The N×1 optical switch assembly of claim 1, wherein the N MEMS VOAs are integrated in an N MEMS VOA array.

5. The N×1 optical switch assembly of claim 1, wherein each of the MEMS VOAs comprises:
   a substrate;
   a movable focusing mirror, the movable focusing mirror coupled with the substrate, and the movable focusing mirror for reflecting, focusing and steering the light beam in a trajectory;
   an actuator, the actuator coupled with the substrate, and the actuator operatively coupled with the movable focusing mirror, the actuator for actuating the movable focusing mirror between the on position and the off position;
   an input photonic component, the input photonic component coupled with the substrate, and the light beam emitting from the input photonic component and toward the movable focusing mirror; and
   an output photonic component, the output photonic component coupled with the substrate and positioned to receive the light beam reflected from the movable focusing mirror when the focusing mirror is in the on position.

6. An optical performance monitor (OPM) assembly having N ports, wherein N is an integer greater than one, the OPM assembly that includes:
   an N×1 optical switch assembly that includes:
      N optical input ports,
      N micro-electro-mechanical system (MEMS) variable optical attenuators (VOAs), wherein each MEMS VOA is optically coupled to a respective optical input port and is operable between an on position and an off position, and
      a N×1 optical combiner optically coupled to the N MEMS VOAs, wherein each MEMS VOA is configured to transmit an optical signal from a respective one of the optical input ports to the optical combiner in the on position and to not transmit the optical signal in the off position;
   a single-port OPM optically coupled to the N×1 optical combiner; and
   a controller in communication with the single-port OPM and each of the MEMS VOAs, wherein the controller is configured to control the MEMS VOAs so that when one of the MEMS VOAs is in the on position the remaining MEMS VOAs are in the off position.

7. The OPM assembly of claim 6, wherein N equals four.

8. The OPM assembly of claim 6, wherein each of the N MEMS VOAs are operable by application of an electric current or voltage.

9. The OPM assembly of claim 6, wherein the N MEMS VOAs are integrated in an N MEMS VOA array.

10. The OPM assembly of claim 6, wherein each of the MEMS VOAs comprises:
    a substrate;
    a movable focusing mirror, the movable focusing mirror coupled with the substrate, and the movable focusing mirror for reflecting, focusing and steering the light beam in a trajectory;
    an actuator, the actuator coupled with the substrate, and the actuator operatively coupled with the movable focusing mirror, the actuator for actuating the movable focusing mirror between the on position and the off position;
    an input photonic component, the input photonic component coupled with the substrate, and the light beam emitting from the input photonic component and toward the movable focusing mirror; and
    an output photonic component, the output photonic component coupled with the substrate and positioned to receive the light beam reflected from the movable focusing mirror when the focusing mirror is in the on position.

11. The OPM assembly of claim 6, wherein the single-port OPM is a Fabry-Perot interferometer.

12. The OPM assembly of claim 6, wherein the single-port OPM comprises:
    a housing;
    a first glass plate fixed to the housing and having a partially reflective coating on a first side;
    a second glass plate parallel to the first glass plate and having a partially reflective coating on a first side, wherein the first sides face one another;
    an actuator operable to move the second glass plate relative to the first glass plate; and
    a photodetector optically coupled to the two glass plates.

13. The OPM assembly of claim 6, wherein each one MEMS VOA is optically coupled to a different one of the N optical input ports and each one MEMS VOA is configured to transmit the optical signal from the different one of the optical input ports.

14. The OPM assembly of claim 13, wherein each one MEMS VOA is optically coupled only to the different one optical input port.

15. The N×1 optical switch assembly of claim 1, wherein each one MEMS VOA is optically coupled only to the different one optical input port.

16. A method of using an optical switch assembly, comprising:
    inputting first and second composite optical signals to the optical switch assembly to respective micro-electro-mechanical system (MEMS) variable optical attenuators (VOAs); and
    transmitting only one of the composite optical signals to an optical combiner.

17. The method of claim 16, further comprising transmitting the one of the composite optical signals to an optical performance monitor (OPM).

18. The method of claim 17, wherein the first and second composite optical signals are tapped from an optical fiber at a location proximate to respective upstream and downstream ports of an optical amplifier or an add/drop station.

19. The method of claim 18, further comprising analyzing data from the OPM relating to operation of the optical amplifier or add/drop station.

20. The method of claim 19, further comprising adjusting or servicing the optical amplifier or add/drop station.

* * * * *